United States Patent
Okura et al.

(10) Patent No.: US 11,498,220 B2
(45) Date of Patent: Nov. 15, 2022

(54) CONTROL SYSTEM AND CONTROL METHOD

(71) Applicant: OMRON Corporation, Kyoto (JP)

(72) Inventors: Takafumi Okura, Kusatsu (JP); Taku Oya, Barcelona (ES)

(73) Assignee: OMRON Corporation, Kyoto (JP)

( * ) Notice: Subject to any disclaimer, the term of this patent is extended or adjusted under 35 U.S.C. 154(b) by 148 days.

(21) Appl. No.: 16/805,226

(22) Filed: Feb. 28, 2020

(65) Prior Publication Data

US 2020/0398435 A1 Dec. 24, 2020

(30) Foreign Application Priority Data

Jun. 20, 2019 (JP) .............................. JP2019-114597

(51) Int. Cl.
*B25J 9/16* (2006.01)

(52) U.S. Cl.
CPC .................................. *B25J 9/1697* (2013.01)

(58) Field of Classification Search
CPC ...... B25J 9/1653; B25J 9/1671; B25J 9/1692; B25J 9/1697; B25J 19/023
See application file for complete search history.

(56) References Cited

U.S. PATENT DOCUMENTS

| | | | |
|---|---|---|---|
| 4,833,381 A * | 5/1989 | Taft | B23Q 35/128 219/124.34 |
| 6,167,607 B1 * | 1/2001 | Pryor | A01B 69/008 29/407.04 |
| 9,519,736 B2 * | 12/2016 | Atohira | B25J 9/1671 |
| 10,525,598 B2 * | 1/2020 | Takahashi | B25J 9/1641 |

(Continued)

FOREIGN PATENT DOCUMENTS

| | | |
|---|---|---|
| JP | H11-239989 A | 9/1999 |
| JP | 2015-024480 A | 2/2015 |

OTHER PUBLICATIONS

Gaku Nakano et al., "A Unified Solution to the PnP Problem for General Camera Model Based on Direct Computation of All the Stationary Points", IEICE Transaction D vol. J95-D, No. 8, pp. 1565-1572, 2012, Concise explanation of relevance provided in the specification.

(Continued)

*Primary Examiner* — Nicholas Kiswanto
(74) *Attorney, Agent, or Firm* — Metrolex IP Law Group, PLLC

(57) ABSTRACT

A control device estimates a position and pose of an imaging device relative to a robot based on an image of the robot captured by the imaging device. A simulation device arranges a robot model at a teaching point, and generates a simulation image of the robot model captured by a virtual camera that is arranged so that a position and pose of the virtual camera relative to the robot model in the virtual space coincide with the estimated position and pose of the imaging device. The control device determines an amount of correction of a position and pose of the robot for the teaching point so that the position and pose of the robot on the actual image captured after the robot has been driven according to a movement command to the teaching point approximate to the position and pose of the robot model on the simulation image.

6 Claims, 12 Drawing Sheets

(56) References Cited

U.S. PATENT DOCUMENTS

| | | | |
|---|---|---|---|
| 2014/0018957 A1* | 1/2014 | Matsumoto | B25J 9/1697 700/251 |
| 2014/0236565 A1* | 8/2014 | Kuwahara | B25J 9/1671 703/22 |
| 2015/0158181 A1* | 6/2015 | Kawamura | B25J 9/1697 700/259 |
| 2020/0078948 A1* | 3/2020 | Krause | B25J 9/1692 |
| 2020/0262080 A1* | 8/2020 | Ghobadi | B25J 9/1697 |
| 2021/0023694 A1* | 1/2021 | Chen | B25J 19/023 |
| 2021/0107157 A1* | 4/2021 | Bai | B25J 9/1633 |
| 2021/0252713 A1* | 8/2021 | Mimura | B25J 19/023 |

OTHER PUBLICATIONS

"Camera Position and Pose Estimation 0, Epipolar Geometry", [online], Jan. 26, 2018, Daily Tech Blog, [Searched on Jun. 1, 2019], the Internet <http://daily-tech.hatenablog.com/entry/2018/01/26/064603>, Concise explanation of relevance provided in the specification.

Akihito Seki, "3D Shape Reconstruction from Mobile Camera Images and Localization (SLAM) and Dense 3D shape reconstruction", IPSJ SIG Technical Report, Jan. 2014, vol. 2014-CVIM-190, No. 40., Concise explanation of relevance provided in the specification.

Syunichi Maki et al., "Development of Teaching Methods for the Rehabilitation Robot", [online], 2009, Technical Report by Aichi Center for Industry and Science Technology, [Searched on Jun. 1, 2019], the Internet <http://www.aichi-inst.jp/sangyou/research/report/2009_01.pdf>, Concise explanation of relevance provided in the specification.

Koichi Hashimoto, "Visual Servoing", Measurement and Control, vol. 35, No. 4, pp. 282-285, Apr. 1996, Concise explanation of relevance provided in the specification.

Extended European search report (EESR) dated Sep. 28, 2020 in a counterpart European patent application.

* cited by examiner $^{BM}H_{CM} = {}^{B}H_{C}$

FIG.10
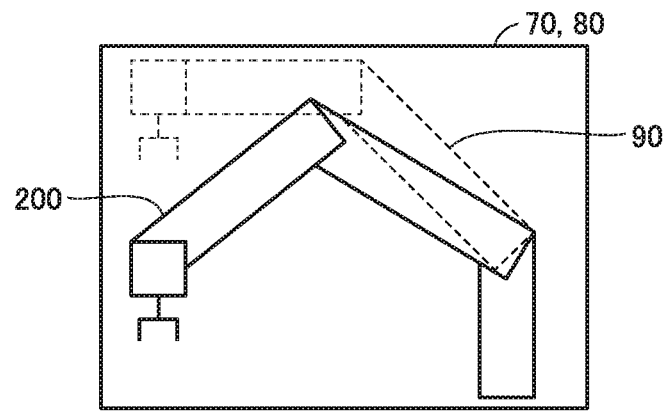
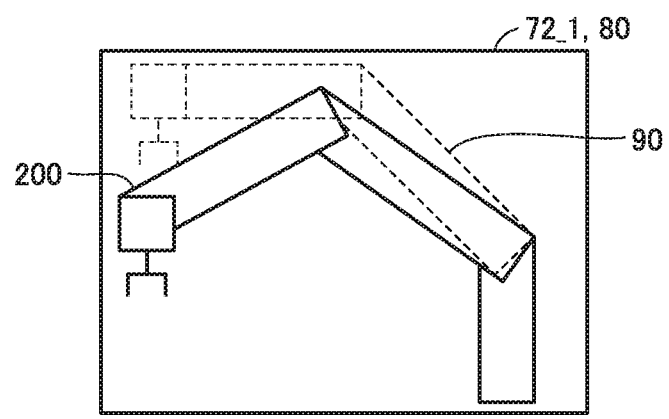
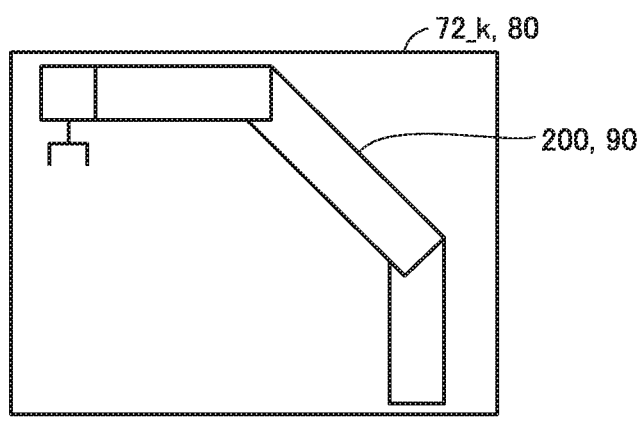

CONTROL SYSTEM AND CONTROL METHOD

BACKGROUND OF THE INVENTION

Field of the Invention

The present technology relates to a control system and a control method for controlling a robot.

Description of the Background Art

Japanese Patent Laying-Open No. H11-239989 discloses a calibration device which calibrates a simulation model of an object, using an actual image of the object captured by a camera mounted on a robot. Specifically, a graphics image of the object that is generated having the same angle of view and viewing position as the camera and the actual image of the object are superimposed one on the other and displayed, and the simulation model is calibrated so that these images coincide with each other.

SUMMARY OF THE INVENTION

The technology disclosed in Japanese Patent Laying-Open No. H11-239989 presumes that the relative positional relationship is fixed between the robot and the camera mounted on the robot. Once a deviation occurs in the relative positional relationship, the robot cannot be accurately operated according to simulation. The technology disclosed in Japanese Patent Laying-Open No. H11-239989 is also not applicable to the case where the camera cannot be mounted on a robot.

The present invention is made in view of the above problem, and an object of the present invention is to provide a control system and a control method which allows accurately operating a robot according to simulation.

According to one example of the present disclosure, a control system for controlling a robot includes: a simulation device; a robot controller; an imaging device; and an estimation module. The simulation device performs simulation using a robot model indicating a shape of the robot. The robot controller drives the robot according to a movement command provided to the robot controller. The imaging device captures an image of the robot. The estimation module estimates a position and pose of the imaging device relative to the robot based on the image of the robot captured by the imaging device. The simulation device includes: a setting module for performing offline teaching to set a teaching point indicative of a position and pose to be taken by the robot; and an image generating module for generating a simulation image of the robot model captured by a virtual camera arranged in a virtual space. The image generating module arranges the robot model at the teaching point in the virtual space and generates a first simulation image of the robot model captured by the virtual camera that is arranged so that a position and pose of the virtual camera relative to the robot model coincide with the position and pose of the imaging device estimated by the estimation module. The control system further includes a first acquisition module and a determination module. The first acquisition module provides the robot controller with a first movement command to the teaching point and acquires a first actual image of the robot captured by the imaging device after the robot has been driven according to the first movement command. The determination module determines an amount of correction of a position and pose of the robot for the teaching point so that a position and pose of the robot on the first actual image approximates to a position and pose of the robot model on the first simulation image.

According to the present disclosure, the actual operation of the robot can be approximated to the operation of the robot model on the virtual space simulated in the simulation device. In other words, an error between the actual operation of the robot and the simulation operation, due to an error between the actual environment and the virtual environment, can be corrected automatically. As a result, the robot can be accurately operated according to the simulation.

In the above disclosure, the determination module includes a deviation calculation module and a correction amount calculating module. The deviation calculation module calculates a deviation between the position and pose of the robot on an actual image of the robot captured by the imaging device and the position and pose of the robot model on the first simulation image. The correction amount calculation module calculates, as the amount of correction, an amount of movement from the position and pose of the robot that has been driven according to the first movement command to a position and pose of the robot when the deviation is less than a predetermined threshold.

According to the present disclosure, the actual operation of the robot can be conformed to the simulation operation with more accuracy.

In the above disclosure, the determination module further includes a second acquisition module for providing the robot controller with a second movement command in a direction that reduces the deviation and performing an acquisition process for acquiring a second actual image captured of the robot by the imaging device when the robot has been driven according to the second movement command. The second acquisition module repeatedly performs the acquisition process since the robot has been driven according to the first movement command until the deviation is less than the threshold. As the amount of correction, the correction amount calculating module calculates a cumulative amount of second movement commands provided to the robot controller.

According to the present disclosure, the amount of movement from the position and pose of the robot driven according to the first movement command to the position and pose of the robot when the deviation is less than the predetermined threshold, can be readily calculated.

In the above disclosure, the determination module includes a deviation calculation module and a correction amount calculating module. The deviation calculation module calculates a deviation between the position and pose of the robot on the first actual image and a position and pose of the robot model on the simulation image. The correction amount calculating module calculates, as the amount of correction, an amount of movement from a position and pose of the robot model when the deviation is less than a predetermined threshold to a position and pose of the robot model arranged at the teaching point.

According to the present disclosure, there is no need to move the robot when determining the amount of correction of the position and pose of the robot, thereby reducing the time it takes to determine the amount of correction.

In the above disclosure, the control system includes a control device that controls the robot controller and the imaging device, the control device being connected to the imaging device, the robot controller, and the simulation device. The estimation module, the first acquisition module, and the determination module are included in the control device.

According to the present disclosure, calculations necessarily for the determination of the amount of correction for the teaching point are carried out in a distributed fashion among multiple pieces of equipment, including the control device, the robot controller, and the simulation device. In other words, loads on the equipment can be distributed.

According to one example of the present disclosure, a control system that controls a robot includes: a robot controller for driving the robot according to a movement command provided to the robot controller; and an imaging device for capturing an image of the robot. A control method in the control system includes first through fifth steps. The first step performs offline teaching using a robot model to set a teaching point indicative of a position and pose to be taken by the robot. The second step estimates a position and pose of the imaging device relative to the robot based on the image of the robot captured by the imaging device. The third step arranges the robot model at the teaching point in a virtual space and generates a simulation image of the robot model captured by the virtual camera that is arranged so that a position and pose of the virtual camera relative to the robot model coincide with the position and pose of the imaging device estimated in the second step. The fourth step provides the robot controller with a movement command to the teaching point and acquires an actual image of the robot captured by the imaging device after the robot has been driven according to the movement command to the teaching point. The fifth step determines an amount of correction of a position and pose of the robot for the teaching point so that a position and pose of the robot on the actual image approximates to a position and pose of the robot model on the simulation image.

According to this present disclosure also, the robot can be accurately operated according to simulation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a diagram showing one example of changes in the actual image as an acquisition process is performed.

DESCRIPTION OF THE PREFERRED EMBODIMENTS

Figure 1:
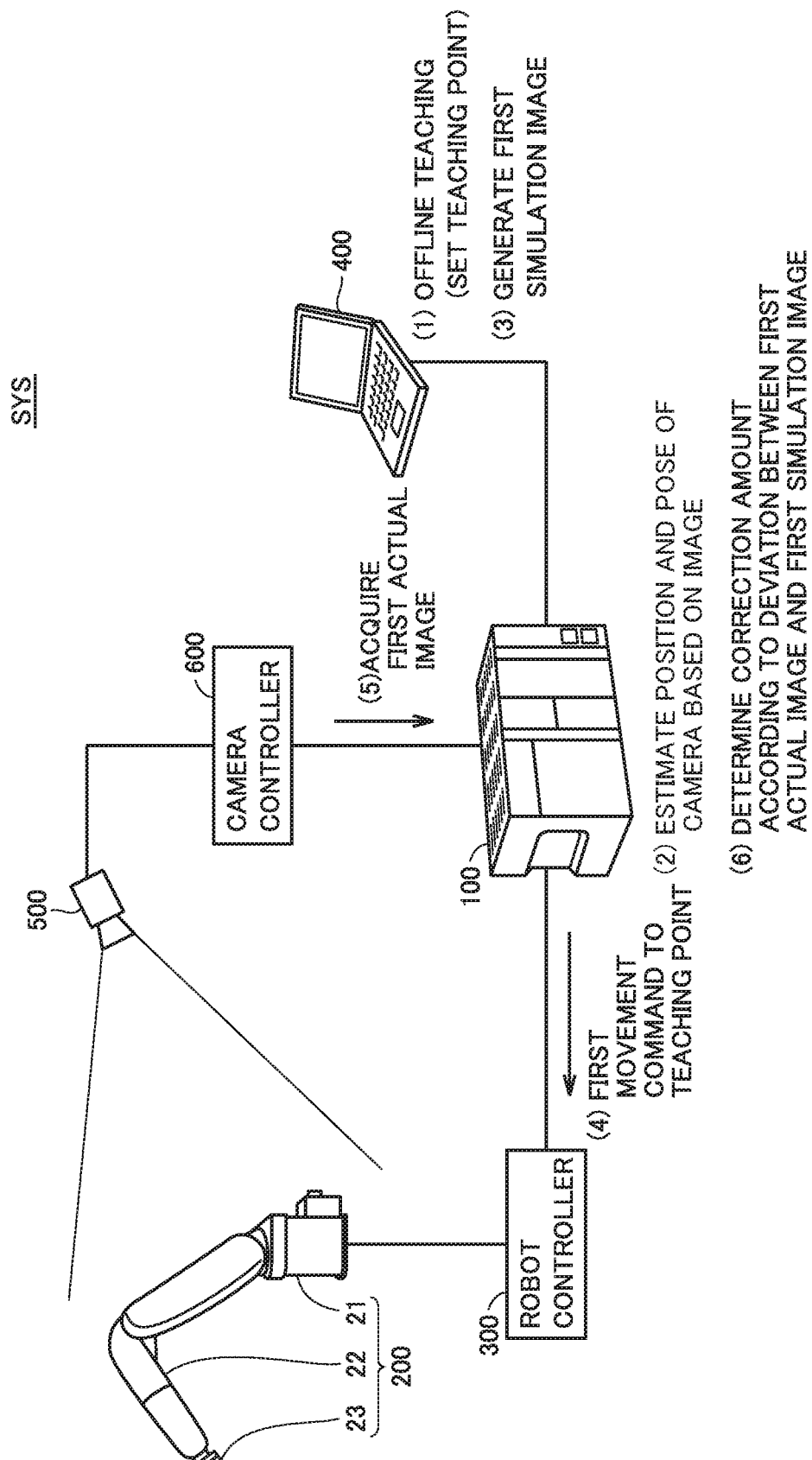
FIG. 1 is a diagram schematically showing an overall example configuration of a control system according to an embodiment of the present invention.

An embodiment of the present invention will be described, with reference to the accompanying drawings. Note that the same reference sign is used to refer to like or corresponding components in the drawings, and description thereof will not be repeated.

§ 1 Application

Initially, referring to FIGS. 1 and 2, one example scenario to which the present invention is applied will be described. FIG. 1 is a diagram schematically showing an overall example configuration of a control system according to the present embodiment.

A control system SYS, illustrated in FIG. 1, includes a control device 100, a robot 200, a robot controller 300, a simulation device 400, an imaging device 500, and a camera controller 600.

Robot 200 is a mechanism which applies given processes (picking, machining, etc.) to an object. Robot 200, illustrated in FIG. 1, is a vertical articulated robot. Robot 200 includes a base 21, an arm 22 coupled to base 21, and an end effector 23 mounted on the distal end of arm 22. Robot 200 further has a servomotor (not shown) for operating arm 22.

Robot controller 300 performs trajectory calculation and angle calculation for each axis according to a movement command from control device 100, and drives the servomotor, included in robot 200, according to a result of the calculations.

Simulation device 400 is configured of, for example, a general-purpose personal computer (PC), and performs a simulation using a robot model indicating the shape of robot 200. Specifically, simulation device 400 performs offline teaching, thereby setting one or more teaching points indicating the position and pose to be taken by robot 200, and generating teaching data describing the set one or more teaching points.

The offline teaching is a process of displaying a robot model and an object model, which indicates the shape of an object, on a virtual space, and setting teaching points according to user input.

For example, when robot 200 performs a pick-and-place operation on an object, multiple teaching points indicating positions and poses to be taken by end effector 23 are described in chronological order in the teaching data covering a period from a moment the end effector 23 grasps the object until end effector 23 places the object on a given place.

Furthermore, simulation device 400 arranges a virtual camera on a virtual space and generates a two-dimensional simulation image of the robot model captured by the virtual camera.

As primary components, imaging device 500 includes an optical system, such as a lens, and an image sensor, such as a CCD (Coupled Charged Device) or CMOS (Complementary Metal Oxide Semiconductor) sensor. Imaging device 500 is installed so that robot 200 is within the field of view of imaging device 500. Imaging device 500 captures two-dimensional image data (hereinafter, simply referred to as an "image") of robot 200, in response to control by camera controller 600, and outputs the two-dimensional image data to camera controller 600.

Camera controller 600 controls the capturing by imaging device 500, in response to the image capture command from control device 100, and acquires the captured image from imaging device 500. Camera controller 600 outputs the acquired image to control device 100. Note that camera controller 600 may apply given image processing (such as edge emphasis process) on the acquired image.

Control device 100 corresponds to an industrial controller which controls a various objects, such as equipment and devices. Control device 100 is a type of computer that performs control calculations as described below. Typically, control device 100 may be embodied as a PLC (programmable logic controller).

Control device 100 is connected to robot controller 300 and camera controller 600 via a field network, and exchanges data with robot controller 300 and camera controller 600. Furthermore, control device 100 is also connected to simulation device 400 and exchanges data with simulation device 400.

Control device 100 acquires teaching data from simulation device 400, and outputs to robot controller 300 a movement command as a function of the acquired teaching data. This allows robot controller 300 to operate robot 200 according to the teaching data.

As noted above, the teaching data is created by the offline teaching that utilizes the robot model on the virtual space. An error between the virtual environment and the actual environment causes an error between the actual operation of robot 200 and a simulation operation. Control system SYS according to the present embodiment performs the following steps (1) through (6) in order to inhibit such an error from occurring.

(1) Simulation device 400 performs the offline teaching and one or more teaching points are set.

(2) Control device 100 outputs an image capture command for a calibration image to camera controller 600, and acquires a calibration image of robot 200 captured by imaging device 500. Based on the calibration image, control device 100 estimates a position and pose of imaging device 500 relative to robot 200.

(3) Simulation device 400 arranges a robot model in the virtual space at one teaching point selected from the teaching data, and generates a first simulation image of the robot model captured by the virtual camera that is arranged so as to meet the following conditions A.

Conditions A: position and pose of the virtual camera relative to the robot model coincide with the position and pose of imaging device 500 estimated in (2).

(4) Control device 100 generates a movement command (hereinafter, referred to as a "first movement command") to the selected one teaching point, and outputs the first movement command to robot controller 300.

(5) After robot controller 300 drives robot 200 according to the first movement command, control device 100 outputs an image capture command to camera controller 600. Control device 100 then acquires a first actual image of robot 200 captured by imaging device 500 from camera controller 600.

Figure 2:
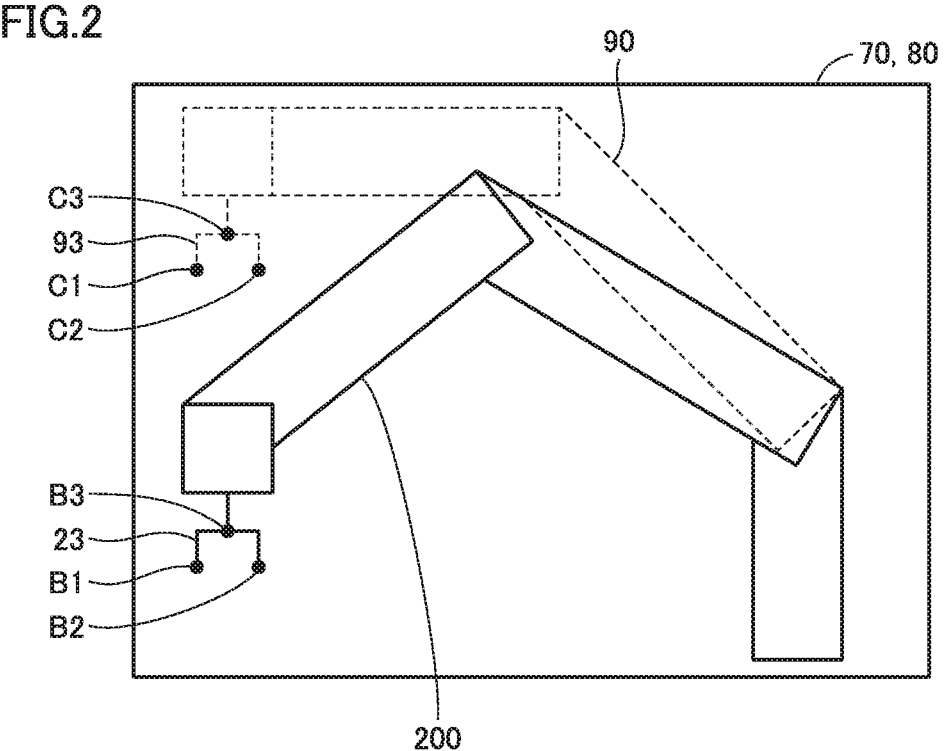
FIG. 2 is a diagram showing one example of a first actual image and a first simulation image overlaid one on the other.

FIG. 2 is a diagram showing one example of an image obtained by overlying the first actual image and the first simulation image one on the other. First actual image 70 is an image of robot 200 that is captured after robot 200 has been driven according to the first movement command to the teaching point. First simulation image 80 is an image captured of a robot model 90 that is arranged at the teaching point. Note that FIG. 2 shows a schematic depiction of robot 200 and robot model 90. Depending on an error between the actual environment and the virtual environment, a deviation can occur between the position and pose of robot 200 on first actual image 70 and the position and pose of robot model 90 on first simulation image 80. Desirably, robot 200 performs the same operates as robot model 90. To that end, the following step (6) is performed.

(6) Control device 100 determines an amount of correction of the position and pose of robot 200 for the teaching point so that the position and pose of robot 200 on first actual image 70 approximates to the position and pose of robot model 90 on first simulation image 80.

This allows the actual operation of robot 200 to be approximated to the operation of robot model 90 on the virtual space simulated in simulation device 400. In other words, an error between the actual operation of robot 200 and the simulation operation, due to an error between the actual environment and the virtual environment, can be corrected automatically. As a result, robot 200 can be accurately operated according to simulation.

Note that if the teaching data describes multiple teaching points, the steps (3) through (6) are repeated for each teaching point.

§ 2 Specific Example

Next, a specific example of control system SYS according to the present embodiment will be described.

<A. Example Hardware Configuration of Control Device>

Figure 3:
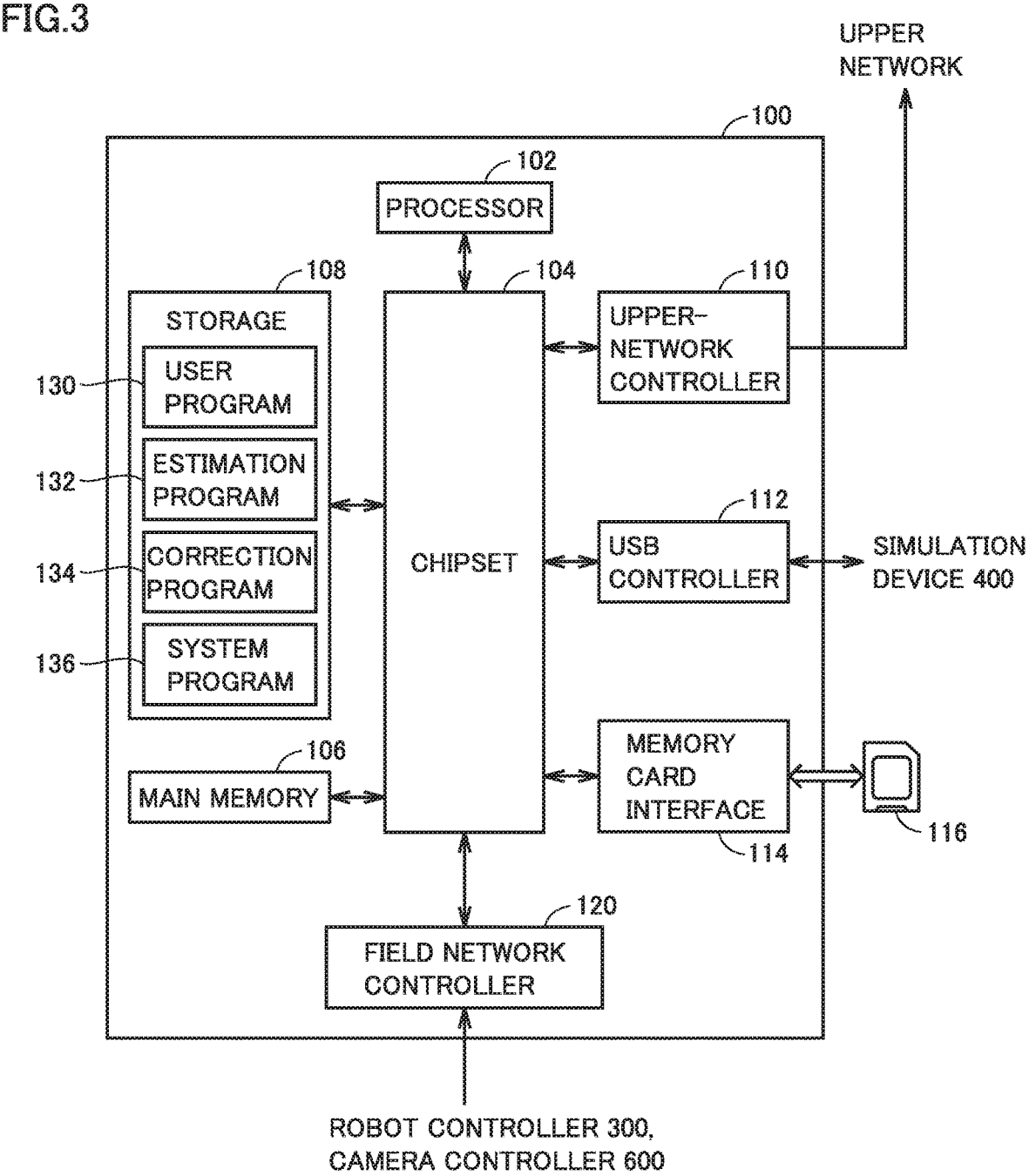
FIG. 3 is a block diagram showing an example hardware configuration of a control device according to the embodiment.

FIG. 3 is a block diagram showing an example hardware configuration of a control device according to the present embodiment. As shown in FIG. 3, control device 100 according to the present embodiment includes a processor 102, such as a central processing unit (CPU) or a microprocessing unit (MPU), a chipset 104, a main memory 106, a storage 108, an upper-network controller 110, a universal serial bus (USB) controller 112, a memory card interface 114, and a field network controller 120.

Processor 102 reads various programs from storage 108, deploy them into main memory 106 and executes them. Chipset 104 controls data transfer between processor 102 and each component.

Storage 108 stores a system program 136 for implementing a basic function, a user program 130, an estimation program 132, and a correction program 134. User program 130 is a program for controlling an object to be controlled. User program 130 is created by a user, depending on the purposes of the control. Estimation program 132 is a program for estimating the position and pose of imaging device 500 relative to robot 200. Correction program 134 is a program for correcting the teaching data.

Upper-network controller 110 controls data exchange with other device via an upper network. USB controller 112 controls data exchange with the other device (e.g., simulation device 400) via USB connection. Note that in the example shown in FIG. 3, data is exchanged between USB controller 112 and simulation device 400. However, upper network controller 110 may control the data exchange with simulation device 400 via the upper network.

Memory card interface 114 is detachable from a memory card 116. Memory card interface 114 is capable of writing data to memory card 116 and reading various data (user program 130, trace data, etc.) from memory card 116.

Field network controller 120 controls data exchange with robot controller 300 and camera controller 600 via the field network.

While FIG. 3 illustrates a configuration in which necessary functions are provided by processor 102 executing the programs, some or all these functions provided may be implemented using a dedicated hardware circuit (e.g., ASIC (Application Specific Integrated Circuit) or FPGA (Field-Programmable Gate Array), etc.). Alternatively, the primary components of control device 100 may be implemented using hardware according to a general-purpose architecture (e.g., a general-purpose personal computer-based industrial personal computer). In this case, using the virtualization technology, multiple operating systems for different applications may be run in parallel and necessary applications may be executed on the respective operating systems.

<B. Example Hardware Configuration of Simulation Device>

Figure 4:
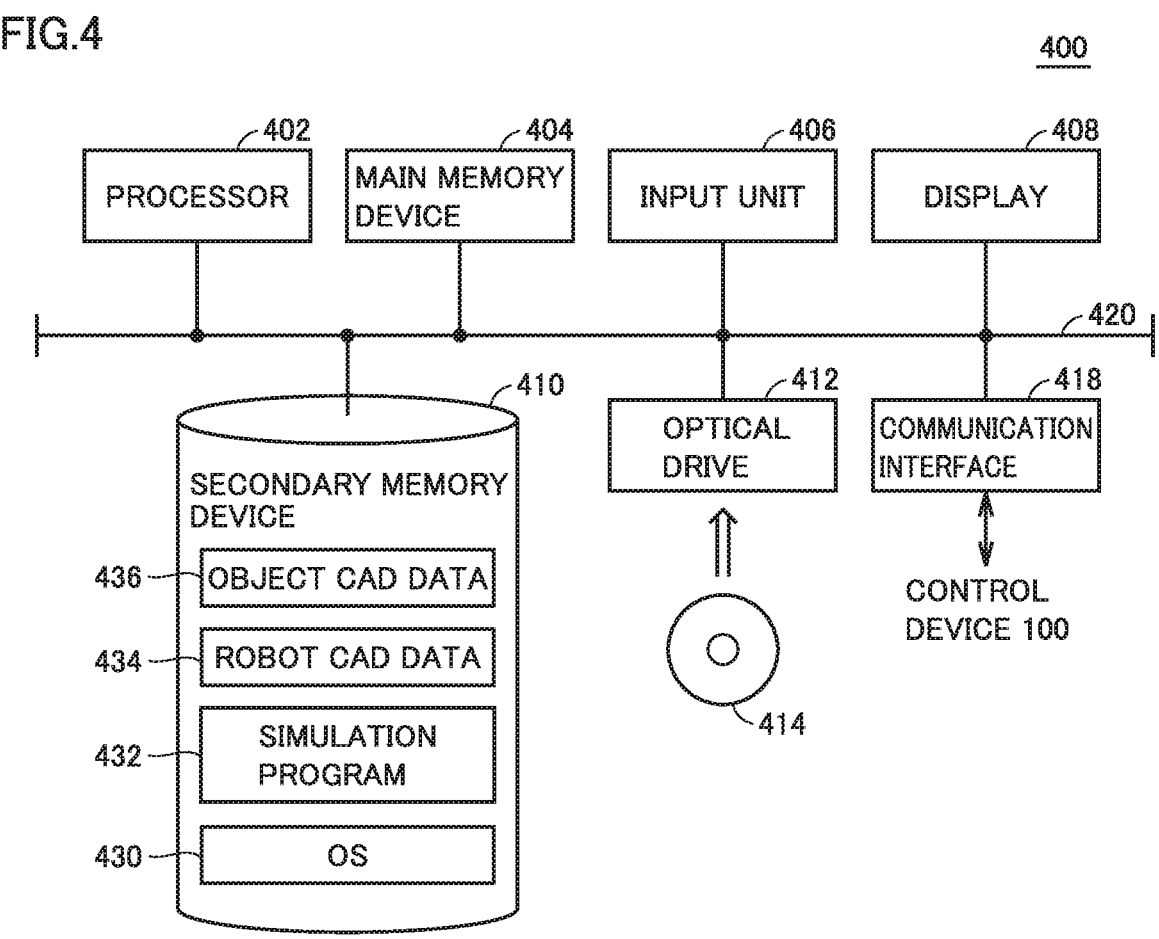
FIG. 4 is a schematic diagram showing an example hardware configuration of a simulation device according to the embodiment.

FIG. 4 is a schematic diagram showing an example hardware configuration of the simulation device according to the present embodiment. As one example, simulation device 400 is implemented using hardware (e.g., a general-purpose personal computer) according to a general-purpose architecture.

As shown in FIG. 4, simulation device 400 includes a processor 402 such as CPU or GPU, a main memory device 404, an input unit 406, a display 408, a secondary memory device 410, an optical drive 412, and a communication interface 418. These components are connected together via a processor bus 420.

Processor 402 reads programs (as one example, an operating system (OS) 430 and a simulation program 432) from secondary memory device 410, deploys them into main memory device 404 and executes them, thereby implementing various processes.

In addition to OS 430 for implementing the basic functions, secondary memory device 410 stores simulation program 432 for providing functions as simulation device 400. Simulation program 432 implements simulation device 400 according to the present embodiment by being executed by an information processing device (substantially, processor 402) which is a computer.

Secondary memory device 410 also stores robot CAD data 434 and object CAD data 436. Robot CAD data 434 is CAD data which indicates the shape of robot 200, indicating robot model 90 (see FIG. 2). Object CAD data 436 is CAD data which indicates the shape of an object to be processed by robot 200, indicating an object model.

Input unit 406 is configured of a keyboard, a mouse, etc., and receives user manipulations. Display 408 displays, for example, a result of processing from processor 402.

Communication interface 418 exchanges data with control device 100 via any communication medium, such as a USB.

Simulation device 400 has optical drive 412. A program, which is stored in a recording medium 414 (e.g., an optical recording medium, such as DVD (Digital Versatile Disc)) storing computer-readable instructions in a non-transitory manner, is read and installed into, for example, secondary memory device 410.

While simulation program 432, which is executed by simulation device 400, may be installed via computer-readable recording medium 414, simulation program 432 may be installed by downloading it from, for example, a server device on a network. The functions provided by simulation device 400 according to the present embodiment may be implemented in a manner that utilizes a part of the module provided by the OS.

While FIG. 4 shows the configuration example in which the functions necessary as simulation device are provided 400 by processor 402 executing the programs, some or all of these functions provided may be implemented using a dedicated hardware circuit (e.g., ASIC or FPGA).

<C. Example Functional Configuration of Simulation Device>

Figure 5:
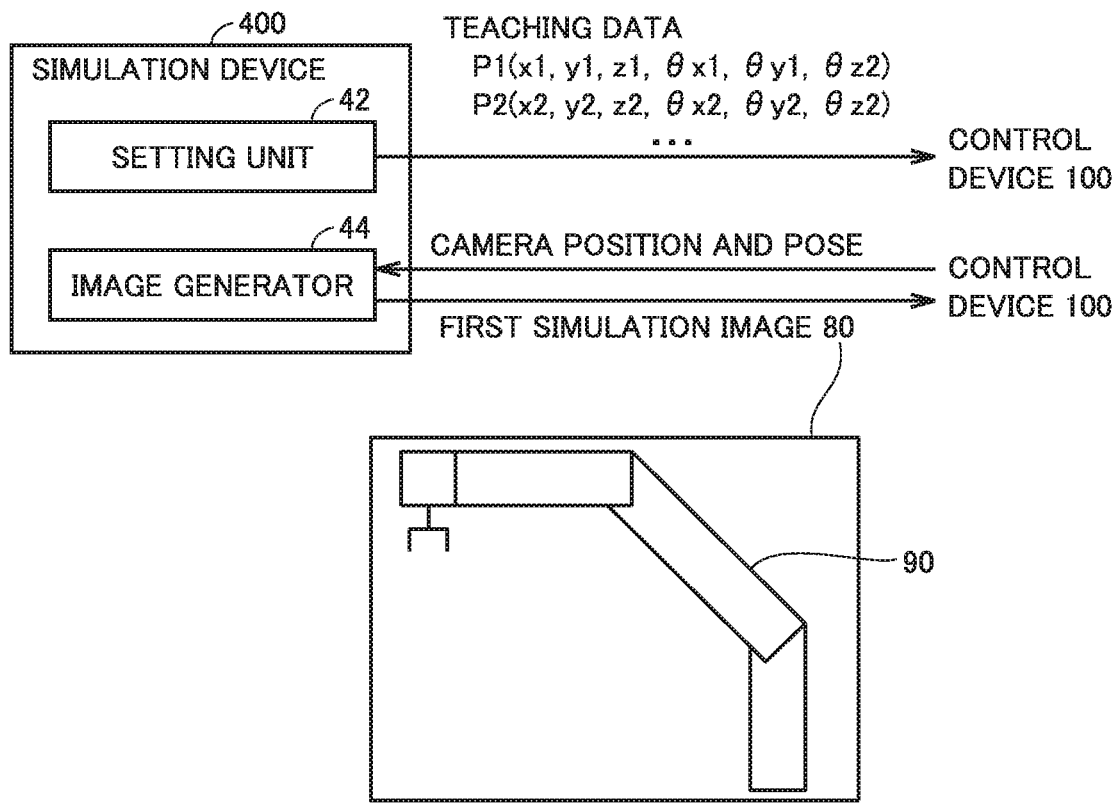
FIG. 5 is a block diagram showing an example functional configuration of the simulation device according to the embodiment.

FIG. 5 is a block diagram showing an example functional configuration of the simulation device according to the present embodiment. As shown in FIG. 5, simulation device 400 includes a setting unit 42 and an image generator 44. Setting unit 42 and image generator 44 are implemented by processor 402 executing simulation program 432.

Setting unit 42 sets teaching points by performing offline teaching according to user input.

Figure 6:
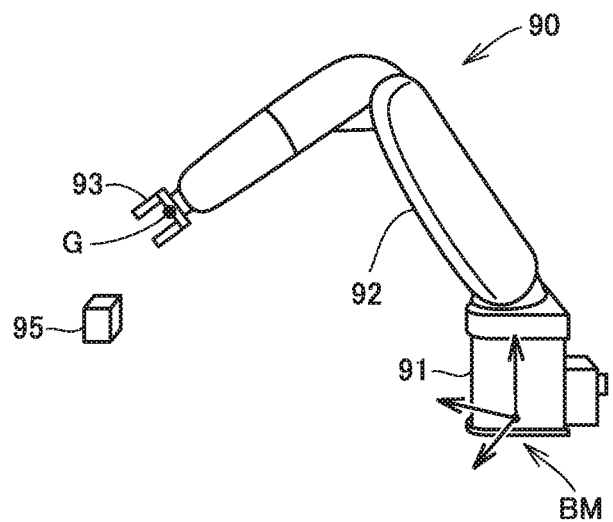
FIG. 6 is a diagram illustrating a method of setting a teaching point.

FIG. 6 is a diagram illustrating a method of setting teaching points. As shown in FIG. 6, setting unit 42 displays on display 408 (see FIG. 4) a virtual space in which robot model 90 indicated by robot CAD data 434 (see FIG. 4) and an object model 95 indicated by object CAD data 436 are arranged. Robot model 90 includes a base model 91 corresponding to base 21 (see FIG. 1), an arm model 92 corresponding to arm 22, and an end effector model 93 corresponding to end effector 23.

The user is allowed to operate input unit 406 (see FIG. 4) to cause robot model 90 to perform a desired process (e.g., picking) on object model 95 on the virtual space. The user causes robot model 90 to operate until end effector model 93 reaches the position and pose to be taken to perform the desired process, after which the user inputs a teaching point setting indication. Setting unit 42 sets the teaching points according to a state of robot model 90 at the time the teaching point setting indication has been input.

The teaching point, for example, indicates the position and pose of end effector model 93 in a base model coordinate system BM referenced to base model 91. The position of end effector model 93 is indicated by, for example, coordinate values (x, y, z) of the center of gravity G of end effector model 93. The pose of end effector model 93 is indicated by rotation parameters (θx, θy, θz) represented by an Euler angle or a fixed angle.

Returning to FIG. 5, setting unit 42 generates teaching data describing the set one or more teaching points in chronological order, and outputs the generated teaching data to control device 100. In the example shown in FIG. 5, the n-th teaching point Pn is indicated by (xn, yn, zn, θxn, θyn, θzn).

Image generator 44 generates a simulation image captured of robot model 90 by the virtual camera, disposed arranged in the virtual space.

Image generator 44 receives from control device 100 the information indicating the position and pose of imaging device 500 relative to robot 200 (e.g., a transformation matrix $^{B}H_C$). Transformation matrix $^{B}H_C$ is a matrix for transforming the base coordinate system referenced to base 21 of robot 200 into a camera coordinate system referenced to imaging device 500.

Image generator 44 generates a first simulation image of the robot model 90 for each teaching point set by setting unit 42. The first simulation image is of robot model 90 arranged at the teaching point, captured by the virtual camera that is arranged on the virtual space so that the position and pose of the virtual camera relative to robot model 90 coincide with the position and pose of imaging device 500 relative to robot 200 indicated by transformation matrix $^{B}H_{C}$.

Figure 7:
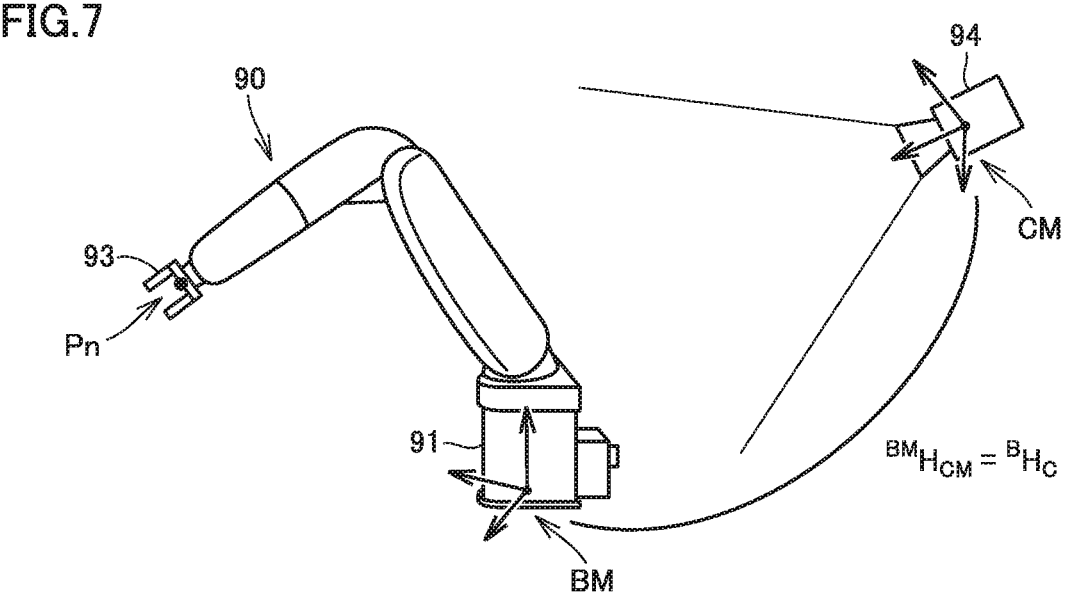
FIG. 7 is a diagram illustrating a method of generation of a first simulation image corresponding to the n-th teaching point Pn.

FIG. 7 is a diagram illustrating a method of generation of a first simulation image corresponding to the n-th teaching point Pn. As shown in FIG. 7, image generator 44 moves robot model 90 so that the position and pose of end effector model 93 is at teaching point Pn.

Furthermore, image generator 44 arranges virtual camera 94 so that a transformation matrix $^{BM}H_{VC}$ coincides with transformation matrix $^{B}H_{C}$ received from control device 100, the transformation matrix $^{BM}H_{VC}$ being for transforming base model coordinate system BM referenced to base model 91 into a virtual camera coordinate system CM referenced to a virtual camera 94. Transformation matrix $^{BM}H_{VC}$ represents components of a basis vector and the position of origin for the virtual camera coordinate system in terms of the base model coordinate system, showing the position and pose of virtual camera 94 relative to robot model 90 (specifically, base model 91).

Returning to FIG. 5, image generator 44 output to control device 100 first simulation image 80 generated for each teaching point. First simulation image 80 contains robot model 90 arranged at the teaching point, as viewed from virtual camera 94.

<D. Example Functional Configuration of Control Device>

Figure 8:
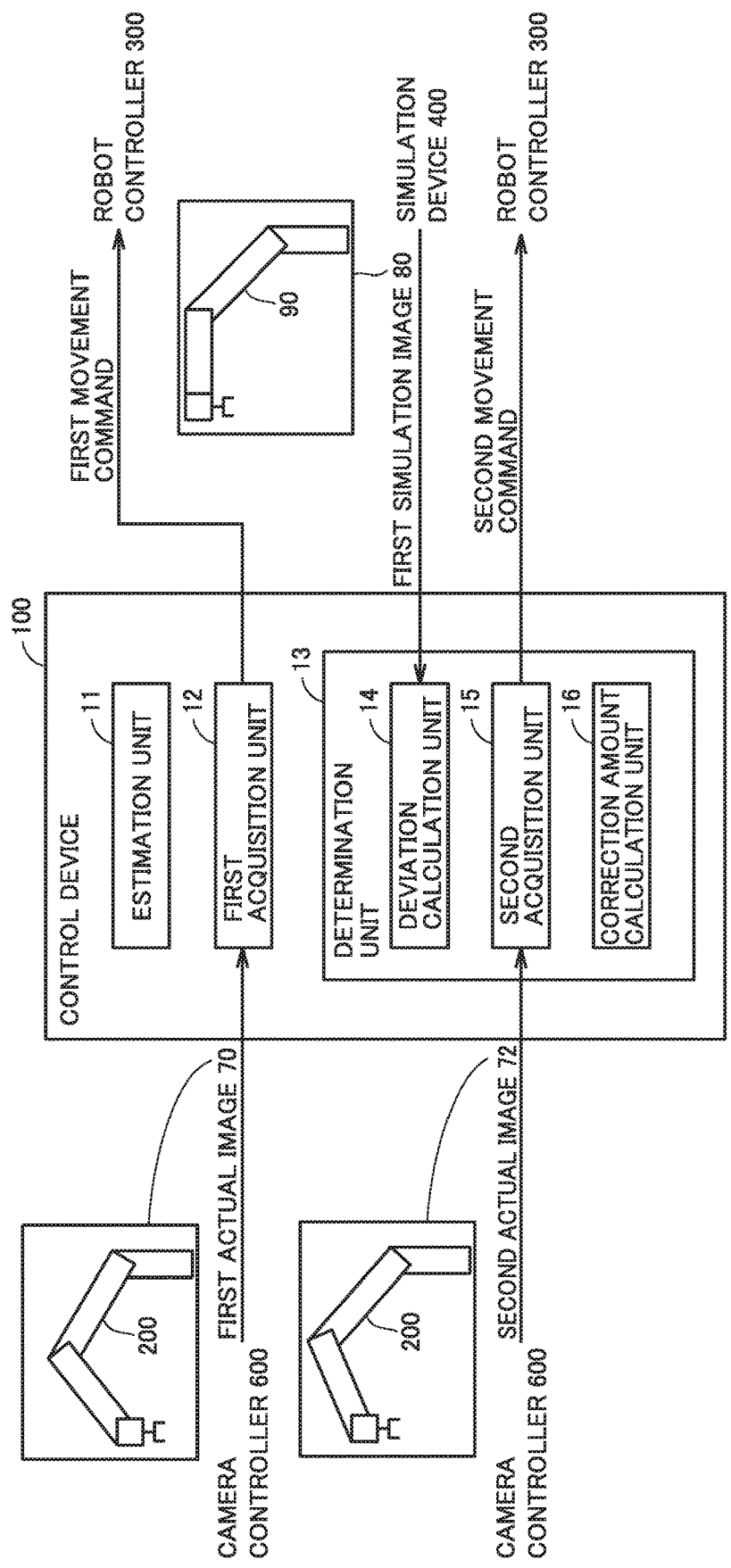
FIG. 8 is a block diagram showing an example functional configuration of the control device according to the embodiment.

FIG. 8 is a block diagram showing an example functional configuration of the control device according to the present embodiment. As shown in FIG. 8, control device 100 includes an estimation unit 11, a first acquisition unit 12, and a determination unit 13. Estimation unit 11 is implemented by processor 102 executing estimation program 132 shown in FIG. 3. First acquisition unit 12 and determination unit 13 are implemented by processor 102 executing correction program 134 shown in FIG. 3.

<D-1. Estimation Unit>

Estimation unit 11 estimates the position and pose of imaging device 500 relative to robot 200, based on an image of robot 200 captured by imaging device 500. Estimation unit 11 may utilize a well-known technology to estimate the position and pose of imaging device 500 relative to robot 200.

For example, estimation unit 11 utilizes a well-known solution of the Perspective-n-Point problem to estimate the position and pose of imaging device 500 relative to robot 200. The solution of the Perspective-n-Point problem is disclosed in, for example, "A Unified Solution to the PnP Problem for General Camera Model Based on Direct Computation of All the Stationary Points," by Gaku NAKANO and two others, IEICE Transaction D Vol. J95-D, No. 8, pp. 1565-1572, 2012.

Figure 9:
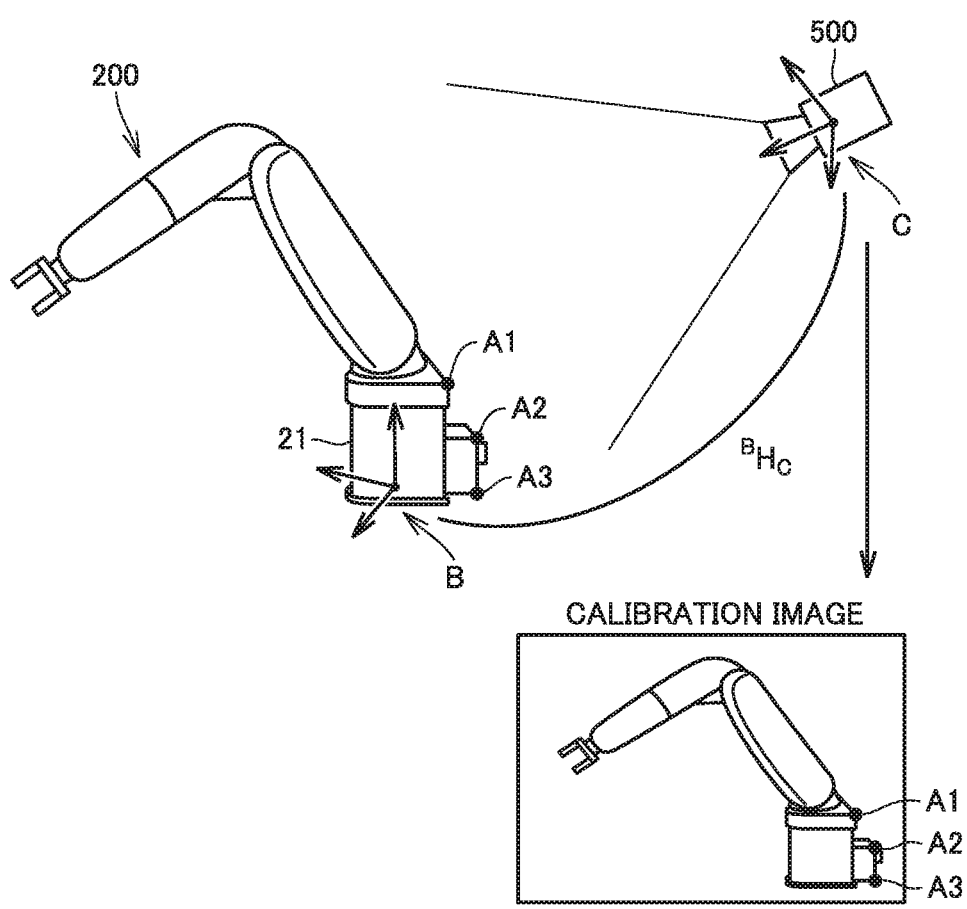
FIG. 9 is a diagram illustrating one example of a method of estimation of position and pose of the imaging device relative to a robot.

FIG. 9 is a diagram illustrating one example of the method of estimation of the position and pose of the imaging device relative to the robot. Three-dimensional coordinates for at least three feature points A1 to Am (m is an integer greater than or equal to 3) on base 21 set at the fixed position are predetermined and recorded to control device 100. Feature points A1 to Am, for example, indicates edges of base 21. The three-dimensional coordinates of feature points A1 to An are indicated by the base coordinate system B referenced to base 21.

Estimation unit 11 acquires from imaging device 500 a calibration image of robot 200 captured by imaging device 500. Estimation unit 11 detects feature points A1 to Am in the calibration image and determines coordinates of feature points A1 to Am on the calibration image.

Estimation unit 11 solves the Perspective-n-Point problem using the three-dimensional coordinates of feature points A1 to Am on the base coordinate system and the coordinates of feature points A1 to Am on the calibration image, thereby estimating position and pose of imaging device 500 relative to robot 200. The position and pose of imaging device 500 relative to robot 200 are indicated by a transformation matrix $^{B}H_{C}$ which transforms, for example, the base coordinate system B into a camera coordinate system C (a coordinate system referenced to imaging device 500).

Note that the method of estimation of the position and pose of imaging device 500 relative to robot 200 is not limited thereto.

For example, estimation unit 11 may use an image acquired from imaging device 500 and an image acquired from an imaging device that is separately disposed from imaging device 500, to estimate the position and pose of imaging device 500 relative to robot 200. The method of estimation, using two cameras, of the position and pose of a camera may utilize, for example, the technology disclosed in "Camera Position and Pose Estimation 0, Epipolar Geometry," [online], Jan. 26, 2018, Daily Tech Blog, [Searched on Jun. 1, 2019], the Internet <http://daily-tech.hatenablog.com/entry/2018/01/26/064603>.

Alternatively, estimation unit 11 may use multiple images of robot 200 that are captured while moving the imaging device 500 to estimate the position and pose of imaging device 500 relative to robot 200. The method of estimation, using mobile camera images, of the position and pose of a camera may utilize, for example, the technology disclosed in "3D Shape Reconstruction from Mobile Camera Images and Localization (SLAM) and Dense 3D shape reconstruction" by Akihito SEKI, IPSJ SIG Technical Report, January, 2014, Vol. 2014-CVIM-190, No. 40.

Alternatively, estimation unit 11 may use multiple images of robot 200 that are captured while moving end effector 23 having calibration markers attached thereon, to estimate the position and pose of imaging device 500 relative to robot 200. This estimation method is called hand-eye calibration. The method of estimation of the position and pose of the camera using the hand-eye calibration may utilize, for example, the technology disclosed in "Development of Teaching Methods for the Rehabilitation Robot" [online], 2009, Technical Report by Aichi Center for Industry and Science Technology, [Searched on Jun. 1, 2019], the Internet <http://www.aichi-inst.jp/sangyou/research/report/2009_01.pdf>.

Estimation unit 11 outputs the information indicating the position and pose of imaging device 500 relative to robot 200 (e.g., transformation matrix $^{B}H_{C}$) to simulation device 400.

<D-2. First Acquisition Unit>

For each teaching point indicated by the teaching data, first acquisition unit 12 generates a first movement command to the teaching point, and provides robot controller 300 with the first movement command. Robot 200 is driven according to the first movement command, after which the estimation unit 11 outputs an image capture command to camera controller 600. In this way, estimation unit 11 acquires first actual image 70 of robot 200 that is captured after robot 200 has been driven in response to the first movement command.

<D-3. Determination Unit>

Determination unit 13 determines an amount of correction of the position and pose of robot 200 for the teaching point so that the position and pose of robot 200 on first actual image 70 approximates to the position and pose of robot model 90 on first simulation image 80.

As shown in FIG. 8, determination unit 13 has a deviation calculation unit 14, a second acquisition unit 15, and a correction amount calculation unit 16.

(D-3-1. Deviation Calculation Unit)

Deviation calculation unit 14 calculates the deviation between the position and pose of robot 200 on the actual image and the position and pose of robot model 90 on first simulation image 80.

Deviation calculation unit 14 overlays the actual image and first simulation image 80 one on the other, and calculates the distance between the feature point of robot 200 on the actual image and the feature point of robot model 90 on first simulation image 80 as the deviation.

In the example shown in FIG. 2, feature points B1, B2, which are the distal ends of two claws of end effector 23, and a feature point B3, which is the coupling of the two claws, are extracted as feature points of robot 200. Similarly, feature points C1, C2, which are the distal ends of two claws of end effector model 93, and a feature point C3, which is the coupling of the two claws, are extracted as feature points of robot model 90. For example, deviation calculation unit 14 calculates the sum of distances from feature points B1, B2, and B3 to feature points C1, C2, and C3, respectively, as the deviation between the position and pose of robot 200 on the actual image and the position and pose of robot model 90 on first simulation image 80.

Deviation calculation unit 14 calculates the deviation between the position and pose of robot 200 on first actual image 70 acquired by first acquisition unit 12 and the position and pose of robot model 90 on first simulation image 80, and the deviation between a second actual image 72 acquired by second acquisition unit 15 described below and the position and pose of robot model 90 on first simulation image 80. In the following, the deviation between the position and pose of robot 200 on first actual image 70 and the position and pose of robot model 90 on first simulation image 80 will be referred to as a "first deviation." The deviation between the position and pose of robot 200 on second actual image 72 and the position and pose of robot model 90 on first simulation image 80 will be referred to as a "second deviation."

(D-3-2. Second Acquisition Unit)

Second acquisition unit 15 performs the following acquisition process in response to the first deviation being greater than or equal to a predetermined threshold. In other words, second acquisition unit 15 generates a second movement command in a direction that reduces the deviation between the position and pose of robot 200 on the actual image and the position and pose of robot model 90 on first simulation image 80, and provides robot controller 300 with the second movement command. Robot 200 is driven in response to the second movement command, after which the second acquisition unit 15 outputs an image capture command to camera controller 600. Second acquisition unit 15 then acquires second actual image 72 of robot 200 that is captured after robot 200 has been driven in response to the second movement command.

Second acquisition unit 15 repeatedly performs the above acquisition process until the second deviation between the position and pose of robot 200 on second actual image 72 and the position and pose of robot model 90 on first simulation image 80 is less than the threshold.

Second acquisition unit 15 may utilize a well-known visual servoing technique to generate the second movement command. The visual servoing technique is disclosed in, for example, "Visual Servoing," Measurement and Control, vol. 35, no. 4, p. 282-285, April, 1996 by Koichi HASHIMOTO.

FIG. 10 is a diagram showing one example of changes in the actual image when the acquisition process is performed. FIG. 10 shows first actual image 70, second actual image 72_1 acquired by the first iteration of the acquisition process, and second actual image 72_k acquired by the k-th iteration of the acquisition process (k is an integer greater than or equal to 2). As shown in FIG. 10, the first deviation corresponding to first actual image 70 is large. The second deviation corresponding to second actual image 72_1 is less than the first deviation. The second deviation corresponding to second actual image 72_k is nearly zero.

(D-3-3. Correction Amount Calculation Unit)

Correction amount calculation unit 16 calculates an amount of movement from the position and pose of robot 200 having been driven according to the first movement command to the position and pose of robot 200 when the second deviation is less than the threshold (hereinafter, referred to as a "necessarily amount of movement"), as the amount of correction of the position and pose of robot 200 for the teaching point. Correction amount calculation unit 16 may calculate the cumulative amount of second movement commands provided to robot controller 300 by second acquisition unit 15 as the necessarily amount of movement of robot 200.

The necessarily amount of movement is indicated by translation amounts dx, dy, dz and rotational movement amounts dθx, dθy, dθz in the base coordinate system. Correction amount calculation unit 16 may correct teaching point P by adding the necessarily amount of movement (the amount of correction) to coordinate values (x, y, z, θx, θy, θz) indicative of teaching point P. In other words, the corrected teaching point is indicated by (x+dx, y+dy, z+dz, θx+dθx, θy+dθy, θz+dθz).

<E. Flow of Correction Amount Determination Process>

Figure 11:
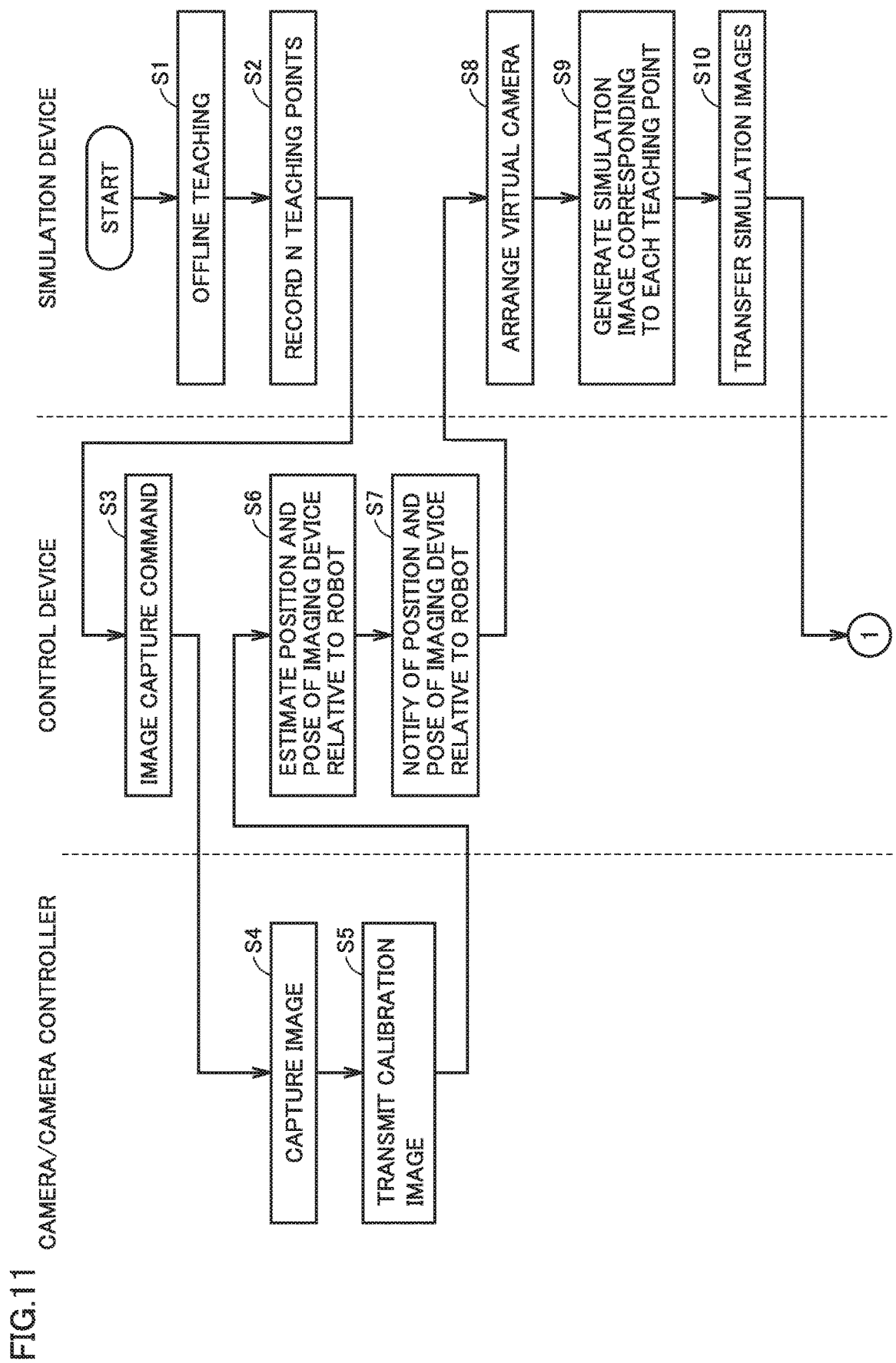
FIG. 11 is a flow chart illustrating a flow of the first half of a process for determining an amount of correction of the position and pose of the robot.
Figure 12:
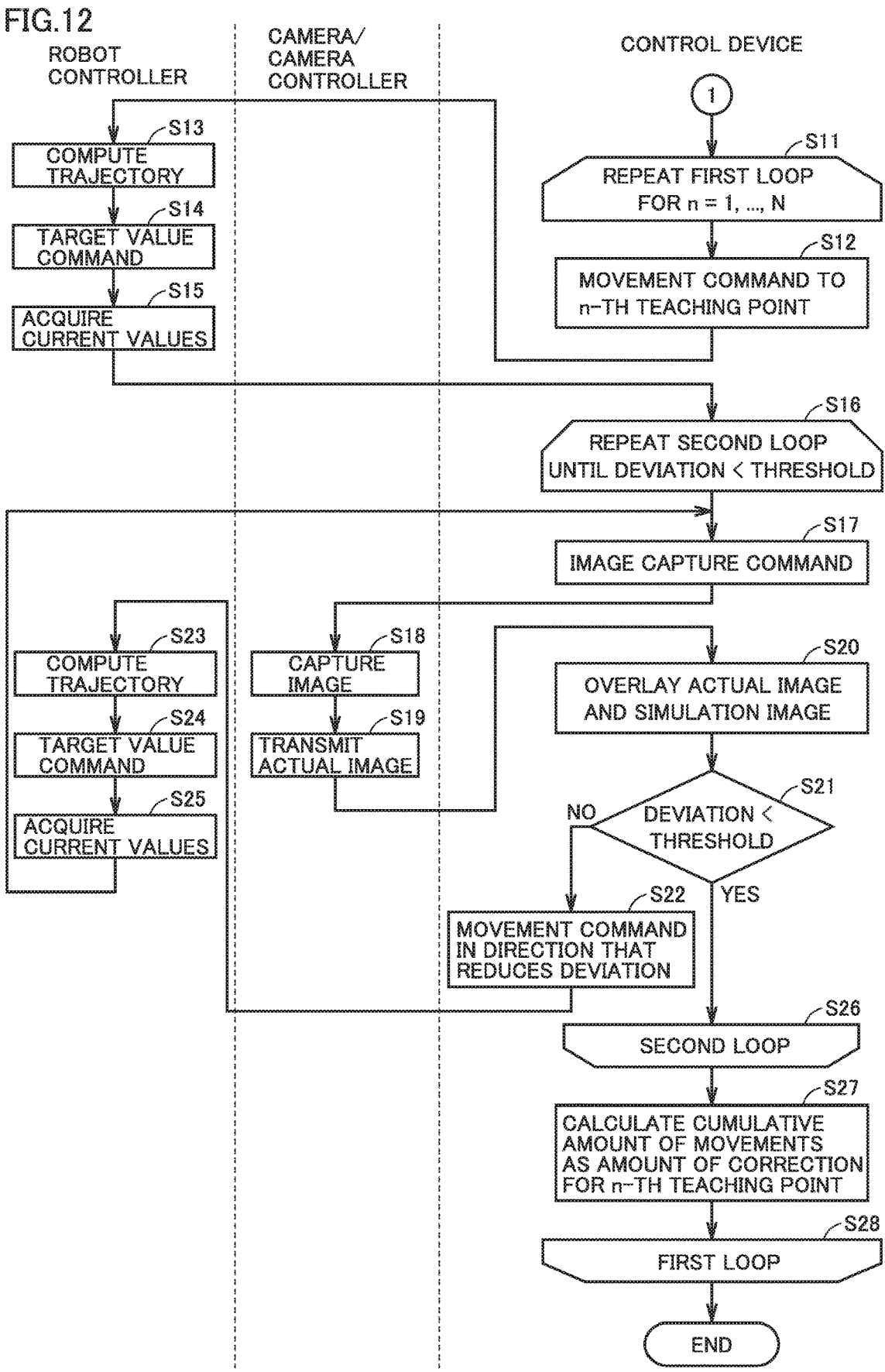
FIG. 12 is a flow chart illustrating a flow of the last half of the process for determining the amount of correction.

Referring to FIGS. 11 and 12, a flow of the correction amount determination process in control system SYS will be described. FIG. 11 is a flow chart illustrating a flow of the first half of the process for determining an amount of correction of the position and pose of robot 200. FIG. 12 is a flow chart illustrating a flow of the last half of the process for determining the amount of correction.

Initially, processor 402 included in simulation device 400 performs offline teaching, thereby setting teaching points (step S1). Processor 402 generates teaching data describing the set N teaching points in chronological order, and records the generated teaching data to storage 108 (step S2). The teaching data recorded to storage 108 is output to control device 100.

Next, processor 102 included in control device 100 outputs an image capture command to camera controller 600 (step S3). Imaging device 500 captures an image of robot 200 according to control by camera controller 600 (step S4). Camera controller 600 transmits to control device 100 the image (a calibration image) captured by imaging device 500 (step S5).

Based on the calibration image, processor 102 included in control device 100 estimates the position and pose of imaging device 500 relative to robot 200 (step S6). Processor 102 notifies simulation device 400 of the estimated position and pose of imaging device 500 (step S7).

Processor 402 included in simulation device 400 arranges the virtual camera on the virtual space so that the position and pose of the virtual camera relative to robot model 90 coincide with the position and pose of imaging device 500 relative to robot 200 notified from control device 100 (step S8). For each of N teaching points, processor 402 generates first simulation image 80 of the robot model 90 when robot model 90 is arranged at the teaching point (step S9). Processor 402 transfers the generated first simulation images 80 to control device 100 (step S10).

Next, processor 102 included in control device 100 executes a first loop of steps S11 through S28. In other words, processor 102 sets n to 1 through N in order and executes the first loop for calculating the amount of correction for the n-th teaching point.

In step S12, processor 102 generates a first movement command to the n-th teaching point, and provides robot controller 300 with the first movement command. Robot controller 300 computes a trajectory from the current position and pose of robot 200 to the n-th teaching point (step S13). Robot controller 300 outputs to robot 200 a target value command according to the computed trajectory (step S14). Robot controller 300 acquires from robot 200 the information indicating the current position and pose of robot 200 (step S15). In this way, robot controller 300 confirms that the position and pose of robot 200 has reached the teaching point.

Next, processor 102 included in control device 100 executes a second loop of steps S16 through S26. Processor 102 repeats the second loop until the deviation between the position and pose of robot 200 on the actual image (first actual image 70 or second actual image 72) and the position and pose of robot model 90 on first simulation image 80 is less than the threshold.

In step S17, processor 102 outputs an image capture command to camera controller 600. Imaging device 500 captures an image of robot 200 according to control by camera controller 600 (step S18). Camera controller 600 transmits the actual image of robot 200 captured by imaging device 500 to control device 100 (step S19). Note that the actual image obtained in step S19 of the first iteration of the second loop is first actual image 70 of robot 200 that is captured after robot 200 has been driven in response to the first movement command.

Processor 102 overlays the actual image, received in step S19, and first simulation image 80 one on the other (step S20). Next, processor 102 calculates the deviation between the position and pose of robot 200 on the actual image and the position and pose of robot model 90 on first simulation image 80 and determines whether the calculated deviation is less than the threshold (step S21).

If the deviation is not less than the threshold (NO in step S21), processor 102 generates a movement command (the second movement command) in a direction that reduces the deviation, and provides robot controller 300 with the second movement command (step S22). Robot controller 300 computes a trajectory from the current position and pose of robot 200 to the position and pose that corresponds to the second movement command (step S23). Robot controller 300 outputs to robot 200 a target value command according to the computed trajectory (step S24). Robot controller 300 acquires from robot 200 the information indicating the current position and pose of robot 200 (step S25). In this way, robot controller 300 confirms that robot 200 has reached the position and pose corresponding to the second movement command. Steps S17 through S21 are then repeated. At this time, the actual image obtained in step S19 is second actual image 72 of robot 200 that is captured after robot 200 has been driven in response to the second movement command.

If the deviation is less than the threshold (YES in step S21), processor 102 ends the second loop, and, in step S27, calculates the cumulative amount of the second movement commands (the cumulative amount of movements) as the amount of correction for the n-th teaching point.

In this way, the first loop (steps S16 through S28) is executed for n=1 through N and the amounts of correction for the first teaching point through the n-th teaching point are thereby determined.

<F. Variations>
<F-1. Variation 1>

In the above description, robot 200 is moved so that the position and pose of robot 200 on the actual image coincide with the position and pose of robot model 90 on first simulation image 80, and this amount of movement of robot 200 is determined as an amount of correction of the position and pose of robot 200 for the teaching point. According to this method, the actual operation of robot 200 can be accurately conformed to the simulation operation. However, since robot 200 is moved, it takes time to determine the amount of correction.

Thus, in order to reduce the time it takes to determine the amount of correction, according to control system SYS of Variation 1, robot model 90 is moved so as to conform to the position and pose of robot 200 on first actual image 70. In the following, details of the control system SYS according to Variation 1 will be described.

Deviation calculation unit 14 according to Variation 1 calculates the deviation between the position and pose of robot 200 on first actual image 70 and the position and pose of robot model 90 on a simulation image. Deviation calculation unit 14 calculates the deviation between the position and pose of robot 200 on first actual image 70 and the position and pose of robot model 90 on the above first simulation image 80 and the deviation between the position and pose of robot 200 on first actual image 70 and the position and pose of robot model 90 on a second simulation image described below. In the following, the deviation between the position and pose of robot 200 on first actual image 70 and the position and pose of robot model 90 on the second simulation image will be referred to as a "third deviation." Note that the deviation between the position and pose of robot 200 on first actual image 70 and the position and pose of robot model 90 on first simulation image 80 will be referred to as a "first deviation" also in Variation 1.

In response to the first deviation being equal to or greater than the threshold, image generator 44 moves robot model 90 in a direction that reduces the deviation between the position and pose of robot 200 on first actual image 70 and the position and pose of robot model 90 on the simulation image. Image generator 44 stores the amount of movement of robot model 90. Image generator 44 then generates the second simulation image of robot model 90 captured by virtual camera 94.

Correction amount calculation unit 16 calculates the amount of movement (necessarily amount of movement) from the position and pose of robot model 90 when the third deviation is less than the threshold to the position and pose of robot model 90 arranged at the teaching point, as the amount of correction of the position and pose of robot 200 for the teaching point.

Figure 13:
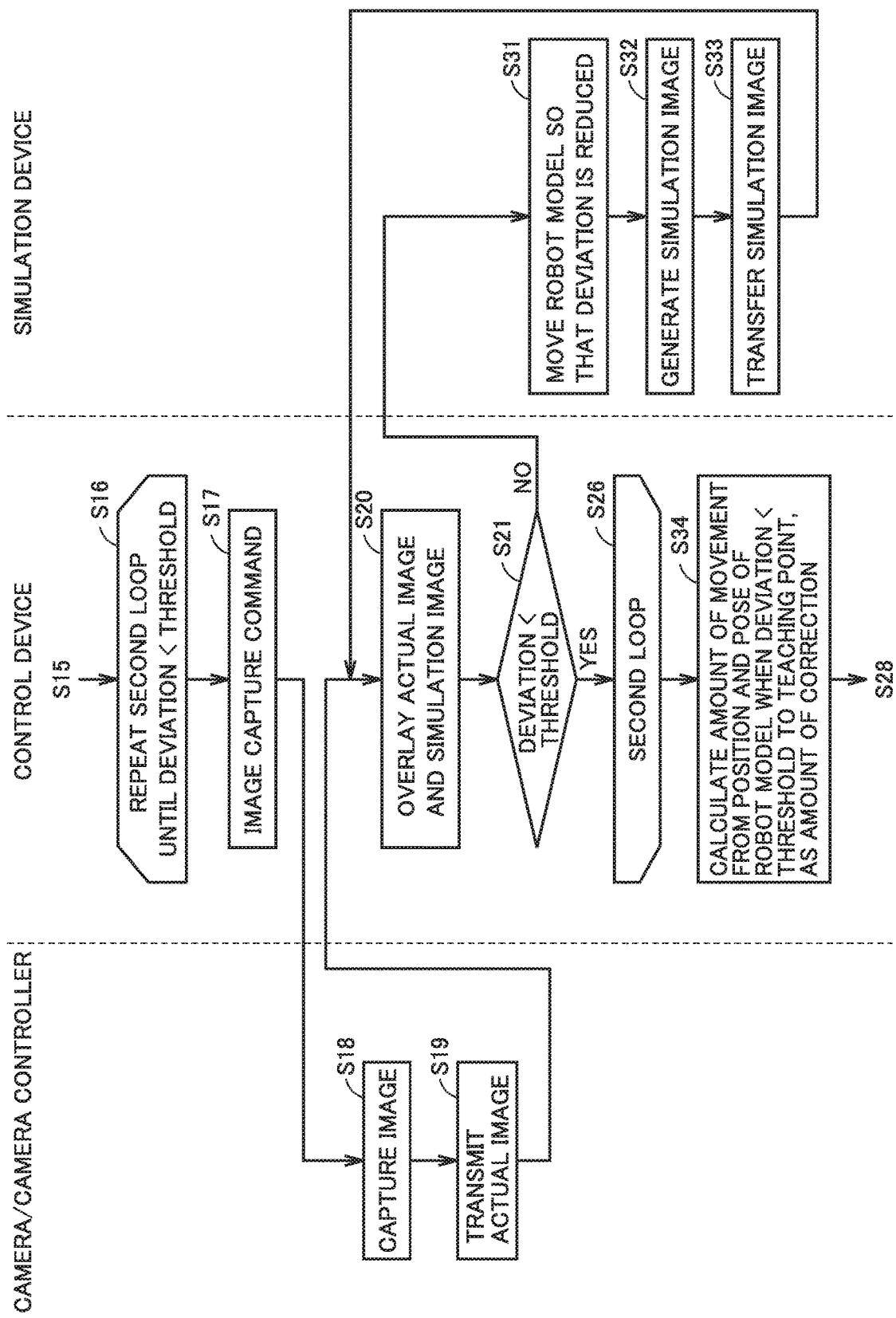
FIG. 13 is a flow chart illustrating a flow of a part of a process for determining an amount of correction of the position and pose of the robot, according to Variation 1 of the embodiment.

FIG. 13 is a flow chart illustrating a flow of a part of the process for determining the amount of correction according to Variation 1. The correction amount determination process according to Variation 1 is the same as the correction amount determination process illustrated in FIGS. 11 and 12, except that the correction amount determination process according to Variation 1 includes steps S31 through S33, instead of steps S22 through S25, and step S34, instead of step S27.

If NO in step S21, processor 402 included in simulation device 400 moves robot model 90 in a direction that reduces the deviation between the position and pose of robot 200 on first actual image 70 and the position and pose of robot model 90 on the simulation image (step S31).

Next, processor 402 generates a second simulation image of robot model 90 captured by virtual camera 94 (step S32). Processor 402 transfers the generated second simulation image to control device 100 (step S33). After step S33, steps S20, S21 are repeated.

If YES in step S21, processor 102 ends the second loop. Processor 102 then calculates an amount of movement from the position and pose of robot model 90 when the deviation is less than the threshold to the position and pose of robot model 90 disposed at the teaching point, as an amount of correction for the teaching point (step S34).

According to Variation 1, the steps for moving robot 200 (steps S22 through S25 in FIG. 12) are unnecessary, thereby reducing the time it takes to determine the amount of correction. However, due to an error between the actual environment and the virtual environment, the amount of correction calculated in step S34 has lower accuracy than the amount of correction calculated in step S27. For this reason, control system SYS according to Variation 1 is applicable to the case where an error between the actual operation of robot 200 and the simulation operation is allowed to some extent.

<F-2. Variation 2>

In the above description, control device 100 determines the amount of correction of the position and pose of robot 200 for the teaching point according to comparison of a two-dimensional actual image with a simulation image. However, control device 100 may determine the amount of correction for the teaching point according to comparison of a three-dimensional actual image with a simulation image.

For example, according to a three-dimensional stereo measurement, camera controller 600 may generate a three-dimensional point cloud (a three-dimensional image) based on two-dimensional images acquired from two imaging devices. Alternatively, according to a patterned light projection method, camera controller 600 may generate a three-dimensional point cloud based on patterned light on a two-dimensional image. As a simulation image, image generator 44 included in simulation device 400 may generate a three-dimensional point cloud (a three-dimensional image) as viewed from virtual camera 94.

According to Variation 2, the actual operation of robot 200 can be accurately conformed to the simulation operation.

<F-3. Variation 3>

In the above description, estimation unit 11 is included in control device 100. However, estimation unit 11 may be included in camera controller 600.

<G. Operations and Effects>

As described above, control system SYS according to the present embodiment includes simulation device 400, robot controller 300, and imaging device 500. Simulation device 400 simulates the operation of robot 200, using robot model 90 indicating the shape of robot 200. Robot controller 300 drives robot 200 according to a provided movement command. Imaging device 500 captures an image of robot 200. Control system SYS further includes estimation unit 11 (processor 102) that estimates the position and pose of imaging device 500 relative to robot 200 based on the image captured by imaging device 500. Simulation device 400 includes setting unit 42 and image generator 44. Setting unit 42 performs offline teaching, thereby setting a teaching point indicative of the position and pose to be taken by robot 200. Image generator 44 generates a simulation image of robot model 90 captured by virtual camera 94 that is arranged in a virtual space. Image generator 44 arranges robot model 90 at the teaching point in the virtual space and generates first simulation image 80 of robot model 90 captured by virtual camera 94 that is arranged so that the position and pose of virtual camera 94 relative to robot model 90 coincide with the position and pose of imaging device 500 relative to robot 200 estimated by estimation unit 11. Control system SYS further includes first acquisition unit 12 and determination unit 13. First acquisition unit 12 provides robot controller 300 with a first movement command to the teaching point, and acquires first actual image 70 of robot 200 that is captured by imaging device 500 after robot 200 has been driven according to the first movement command. Determination unit 13 determines an amount of correction of the position and pose of robot 200 for the teaching point so that the position and pose of robot 200 on first actual image 70 approximates to the position and pose of robot model 90 on first simulation image 80.

According to the above configuration, the actual operation of robot 200 can be approximated to the operation of robot model 90 on the virtual space simulated in simulation device 400. In other words, an error between the actual operation of robot 200 and the simulation operation, due to an error between the actual environment and the virtual environment, can be corrected automatically. As a result, robot 200 can be accurately operated according to simulation.

Moreover, imaging device 500 is installed in the actual environment, after which the estimation unit 11 estimates the position and pose of imaging device 500 relative to robot 200. Virtual camera 94 is then arranged so that the position and pose of virtual camera 94 relative to robot model 90 coincide with the position and pose of imaging device 500 relative to robot 200 estimated by estimation unit 11. In other words, the position and pose of imaging device 500 is reflected to the simulated position and pose of virtual camera 94. This obviates the need for precisely adjusting the position and pose of imaging device 500.

Determination unit 13 includes deviation calculation unit 14 and correction amount calculation unit 16. Deviation calculation unit 14 may calculate the deviation between the position and pose of robot 200 on the actual image captured by imaging device 500 and the position and pose of robot model 90 on first simulation image 80. Correction amount calculation unit 16 may calculate the amount of movement from the position and pose of robot 200 having been driven according to the first movement command to the position and pose of robot 200 when the deviation is less than a predetermined threshold, as the amount of correction of the position and pose of robot 200.

According to the above configuration, the actual operation of robot 200 can be more accurately conformed to the simulation operation.

Specifically, determination unit 13 may include second acquisition unit 15. Second acquisition unit 15 provides robot controller 300 with a second movement command in a direction that reduces the deviation, and performs the acquisition process to acquire second actual image 72 of robot 200 that is captured by imaging device 500 after robot 200 has been driven according to the second movement command. Second acquisition unit 15 repeatedly performs the acquisition process since robot 200 has been driven according to the first movement command until the deviation is less than the threshold. Correction amount calculation unit 16 may calculate the cumulative amount of the second movement commands provided to robot controller 300 as the amount of correction.

This facilitates the calculation of the amount of movement from the position and pose of robot 200 having been driven according to the first movement command to the position and pose of robot 200 when the deviation is less than a predetermined threshold.

Deviation calculation unit 14 may calculate the deviation between the position and pose of robot 200 on first actual image 70 and the position and pose of robot model 90 on a simulation image (first simulation image 80 and second simulation image 82). Correction amount calculation unit 16 may then calculate the amount of movement from the position and pose of robot model 90 when the deviation is less than the predetermined threshold to the position and pose of robot model 90 arranged at the teaching point, as the amount of correction.

This obviates the need for moving robot 200 when determining the amount of correction, thereby reducing the time it takes to determine the amount of correction.

Control system SYS further includes control device 100. Control device 100 is connected to imaging device 500, robot controller 300, and simulation device 400, and controls robot controller 300 and imaging device 500. Estimation unit 11, first acquisition unit 12, and determination unit 13 are included in control device 100.

According to the above configuration, control device 100 estimates the position and pose of imaging device 500 relative to robot 200 and determines the amount of correction of the position and pose of robot 200. Robot controller 300 performs trajectory calculation, etc. for driving robot 200. Simulation device 400 performs offline teaching. As such, the calculations that are necessary to determine the amount of correction for the teaching point are carried out in a distributed fashion among multiple pieces of equipment, including control device 100, robot controller 300, and simulation device 400. In other words, loads on the equipment can be distributed.

<H. Additional Statements>

As described above, the present embodiment and variations thereof include the disclosure as follows:

(Configuration 1)

A control system (SYS) for controlling a robot (200), the control system (SYS) including:

a simulation device (400) for performing simulation using a robot model (90) indicating a shape of the robot (200);

a robot controller (300) for driving the robot (200) according to a movement command provided to the robot controller (300);

an imaging device (500) for capturing an image of the robot (200); and an estimation module (11, 102) for estimating a position and pose of the imaging device (500) relative to the robot (200) based on the image of the robot (200) captured by the imaging device (500), wherein the simulation device (400) includes:

a setting module (42, 402) for performing offline teaching to set a teaching point indicative of a position and pose to be taken by the robot (200); and an image generating module (44, 402) for generating a simulation image of the robot model (90) captured by a virtual camera (94) arranged in a virtual space, wherein the image generating module (44, 402) arranges the robot model (90) at the teaching point in the virtual space and generates a first simulation image (80) of the robot model (90) captured by the virtual camera (94) that is arranged so that a position and pose of the virtual camera (94) relative to the robot model (90) coincide with the position and pose of the imaging device (500) estimated by the estimation module (11, 102), the control system (SYS) further including:

a first acquisition module (12, 102) for providing the robot controller (300) with a first movement command to the teaching point and acquiring a first actual image (70) of the robot (200) captured by the imaging device (500) after the robot (200) has been driven according to the first movement command; and a determination module (13, 102) for determining an amount of correction of a position and pose of the robot (200) for the teaching point so that a position and pose of the robot (200) on the first actual image (70) approximates to a position and pose of the robot model (90) on the first simulation image (80).

(Configuration 2)

The control system (SYS) according to Configuration 1, wherein the determination module (13, 102) includes:

a deviation calculation module (14, 102) for calculating a deviation between the position and pose of the robot (200) on an actual image of the robot (200) captured by the imaging device (500) and the position and pose of the robot model (90) on the first simulation image (80); and a correction amount calculating module (16, 102) for calculating, as the amount of correction, an amount of movement from the position and pose of the robot (200) that has been driven according to the first movement command to a position and pose of the robot (200) when the deviation is less than a predetermined threshold.

(Configuration 3)

The control system (SYS) according to Configuration 2, wherein the determination module (13, 102) further includes a second acquisition module (15, 102) for providing the robot controller (300) with a second movement command in a direction that reduces the deviation and performing an acquisition process for acquiring a second actual image captured of the robot (200) by the imaging device (500) when the robot (200) has been driven according to the second movement command, wherein the second acquisition module (15, 102) repeatedly performs the acquisition process since the robot (200) has been driven according to the first movement command until the deviation is less than the threshold, and as the amount of correction, the correction amount calculating module (16, 102) calculates a cumulative amount of second movement commands provided to the robot controller (300).

(Configuration 4)

The control system (SYS) according to Configuration 1, wherein the determination module (13, 102) includes:

a deviation calculation module (14, 102) for calculating a deviation between the position and pose of the robot (200) on the first actual image (70) and a position and pose of the robot model (90) on the simulation image; and a correction amount calculating module (16, 102) for calculating, as the amount of correction, an amount of movement from a position and pose of the robot model (90) when the deviation is less than a predetermined threshold to a position and pose of the robot model (90) arranged at the teaching point.

(Configuration 5)

The control system (SYS) according to any one of Configurations 1 to 3, including a control device (100) that controls the robot controller (300) and the imaging device (500), the control device (100) being connected to the imaging device (500), the robot controller (300), and the simulation device (400), wherein the estimation module (11, 102), the first acquisition module (12, 102), and the determination module (13, 102) are included in the control device (100).

(Configuration 6)

A control method in a control system (SYS) for controlling a robot (200), the control system (SYS) including:

a robot controller (300) for driving the robot (200) according to a movement command provided to the robot controller (300); and an imaging device for capturing an image of the robot (200), the control method including:

performing offline teaching using a robot model (90) to set a teaching point indicating a position and pose to be taken by the robot (200);

estimating a position and pose of the imaging device (500) relative to the robot (200) based on the image of the robot (200) captured by the imaging device (500);

arranging the robot model (90) at the teaching point in a virtual space and generating a simulation image (80) of the robot model (90) captured by a virtual camera (94) that is arranged so that a position and pose of the virtual camera (94) relative to the robot model (90) coincide with the estimated position and pose of the imaging device (500);

providing the robot controller (300) with a movement command to the teaching point and acquiring an actual image (70) of the robot (200) captured by the imaging device (500) after the robot (200) has been driven according to the movement command to the teaching point; and determining an amount of correction of a position and pose of the robot (200) for the teaching point so that a position and pose of the robot (200) on the actual image (70) approximates to a position and pose of the robot model (90) on the simulation image (80).

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control system for controlling a robot, the control system comprising:

a robot controller for driving the robot according to a movement command provided to the robot controller;

an imaging device for capturing an image of the robot;

one or more processors; and one or more memories having instructions stored thereon that, when executed, cause the one or more processors to perform operations comprising:

performing simulation using a robot model indicating a shape of the robot;

estimating a position and pose of the imaging device relative to the robot based on the image of the robot captured by the imaging device;

performing offline teaching to set a teaching point indicative of a position and pose to be taken by the robot, the offline teaching comprising a process of displaying the robot model in a virtual space and setting the teaching point according to user input for causing the robot model to operate in the virtual space;

generating a simulation image of the robot model captured by a virtual camera arranged in the virtual space, the simulation image including a first simulation image captured by arranging the robot model at the teaching point in the virtual space and arranging the virtual camera so that a position and pose of the virtual camera relative to the robot model coincide with the estimated position and pose providing the robot controller with a first movement command to the teaching point and acquiring a first actual image of the robot captured by the imaging device after the robot has been driven according to the first movement command;

determining an amount of correction of a position and pose of the robot for the teaching point so that a position and pose of the robot on the first actual image approximates to a position and pose of the robot model on the first simulation image; and correcting the teaching point based on the amount of correction.

2. The control system according to claim 1, wherein determining the amount of correction includes:

calculating a deviation between the position and pose of the robot on an actual image of the robot captured by the imaging device and the position and pose of the robot model on the first simulation image; and calculating, as the amount of correction, an amount of movement from the position and pose of the robot that has been driven according to the first movement command to a position and pose of the robot when the deviation is less than a predetermined threshold.

3. The control system according to claim 2, wherein determining the amount of correction includes repeatedly performing an acquisition process from when the robot has been driven according to the first movement command until the deviation is less than the threshold, the acquisition process including i) providing the robot controller with a second movement command in a direction that reduces the deviation and ii) acquiring a second actual image captured of the robot by the imaging device when the robot has been driven according to the second movement command, and calculating the amount of movement includes calculating a cumulative amount of second movement commands provided to the robot controller.

4. The control system according to claim 1, wherein determining the amount of correction includes:

calculating a deviation between the position and pose of the robot on the first actual image and a position and pose of the robot model on the simulation image; and calculating, as the amount of correction, an amount of movement from a position and pose of the robot model when the deviation is less than a predetermined threshold to a position and pose of the robot model arranged at the teaching point.

5. The control system according to claim 1, comprising a control device that controls the robot controller and the imaging device, the control device including at least part of the one or more memories, the at least part of the one or more memories having instructions that, when executed, cause the one or more processors to perform operations further comprising:

performing the simulation;

providing the robot controller with the first movement command and acquiring the first actual image;

determining the amount of correction; and correcting the teaching point.

6. A control method in a control system for controlling a robot, the control system including:
- a robot controller for driving the robot according to a movement command provided to the robot controller; and
- an imaging device for capturing an image of the robot, the control method comprising:
- performing offline teaching using a robot model to set a teaching point indicating a position and pose to be taken by the robot, the offline teaching comprising a process of displaying the robot model in a virtual space and setting the teaching point according to user input for causing the robot model to operate in the virtual space;
- estimating a position and pose of the imaging device relative to the robot based on the image of the robot captured by the imaging device;
- arranging the robot model at the teaching point in the virtual space and generating a simulation image of the robot model captured by a virtual camera that is arranged so that a position and pose of the virtual camera relative to the robot model coincide with the estimated position and pose of the imaging device;
- providing the robot controller with a movement command to the teaching point and acquiring an actual image of the robot captured by the imaging device after the robot has been driven according to the movement command to the teaching point;
- determining an amount of correction of a position and pose of the robot for the teaching point so that a position and pose of the robot on the actual image approximates to a position and pose of the robot model on the simulation image; and
- correcting the teaching point based on the amount of correction.

\* \* \* \* \*